United States Patent
Ito

(10) Patent No.: US 8,054,753 B2
(45) Date of Patent: Nov. 8, 2011

(54) METHOD AND APPARATUS FOR DETERMINING AN INFLUENCED RANGE OF A FAULT OCCURENCE IN A NETWORK

(75) Inventor: Daiji Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 12/494,526

(22) Filed: Jun. 30, 2009

(65) Prior Publication Data

US 2010/0039945 A1 Feb. 18, 2010

(30) Foreign Application Priority Data

Aug. 12, 2008 (JP) .................................. 2008-208209

(51) Int. Cl.
*H04J 1/16* (2006.01)
(52) U.S. Cl. .......................................... 370/242; 714/25
(58) Field of Classification Search .......... 370/216–228, 370/241–252; 714/37, 47, 48, 25
See application file for complete search history.

(56) References Cited

U.S. PATENT DOCUMENTS

| 2005/0097387 | A1 | 5/2005 | Ano et al. |
| 2007/0165533 | A1* | 7/2007 | Wu ................................ 370/242 |
| 2009/0161554 | A1* | 6/2009 | Agarwal et al. ............... 370/241 |

FOREIGN PATENT DOCUMENTS

JP 2005-102180 4/2005

OTHER PUBLICATIONS

J. Rosenberg, et al. "SIP: Session Initiation Protocol" Network Working Group, Jun. 2002.

* cited by examiner

*Primary Examiner* — Ricky Ngo
*Assistant Examiner* — Kan Yuen
(74) *Attorney, Agent, or Firm* — Katten Muchin Rosenman LLP

(57) ABSTRACT

In a network including a group of proxy servers for processing a signaling protocol for transferring signaling messages through a communication route connecting a pair of user terminals, an abnormal end of a communication session established between the pair of user terminals is detected by capturing and analyzing a signaling message received or transmitted by a proxy server. A cause section that has caused the detected abnormal end of the communication session is determined. Then, the number of abnormally ended communication sessions caused by the cause section is counted to determine an influenced range of a fault occurrence in the network on the basis of the counted number of abnormally ended communication sessions caused by each of cause sections and proxy connection information indicative of connection relations among the group of proxy servers.

12 Claims, 12 Drawing Sheets

FIG. 6

601
```
INVITE sip:+813XXXXXXX@client.domain2.sample.com SIP/2.0
Via: SIP/2.0/TCP proxy2.domain2.sample.com:5060;branch=z9hG4bK721e4.1
Via: SIP/2.0/TCP proxy3.domain3.sample.com:5060;branch=z9hG4bK2d4790.1
 ;received=192.0.2.111
Via: SIP/2.0/TCP client.domain3.sample.com:5060;branch=z9hG4bK74bf9
 ;received=192.0.2.101
Max-Forwards: 68
Supported: timer ——611
Record-Route: <sip:proxy2.domain2.sample.com;lr>, ——612
 <sip:proxy3.domain3.sample.com;lr>
From: Alice <sip:+816YYYYYYY@client.domain2.sample.com>;tag=9fxced76sl
To: Bob <sip:+813XXXXXXX@client.domain3.sample.com>
Call-ID: 3848276298220188511@domain3.sample.com
CSeq: 2 INVITE
Contact: <sip:+816YYYYYYY@client.domain3.sample.com;transport=tcp>
Session-Expires: 1800 ——613
Min-SE: 1800 ——614
Content-Type: application/sdp
Content-Length: 151
```

602
```
v=0
o=alice 2890844526 2890844526 IN IP4
client.atlanta.example.com
s=-
c=IN IP4 192.0.2.101
t=0 0
m=audio 49172 RTP/AVP 0
a=rtpmap:0 PCMU/8000
```

METHOD AND APPARATUS FOR DETERMINING AN INFLUENCED RANGE OF A FAULT OCCURENCE IN A NETWORK

CROSS-REFERENCE TO RELATED APPLICATIONS

This application is based upon and claims the benefit of priority of the prior Japanese Patent Application No. 2008-208209, filed on Aug. 12, 2008, the entire contents of which are incorporated herein by reference.

FIELD

The embodiments discussed herein are related to a technology for determining an influenced range of a fault occurrence in a network.

BACKGROUND

In a service for implementing peer-to-peer communication over the Internet, such as IP phones, videophones, or instant messengers, a signaling technology for controlling the establishment, change, and disconnection (or termination) of a peer-to-peer session (for example, communication session) over the Internet is important, in addition to the technology for transmitting, in real time, media information on audio, video, text or the like by using an IP (the Internet protocol) packet.

For example, IP phones, which have become widespread remarkably in recent years, are implemented by combining a VoIP (Voice over IP) technology for transmitting an audio signal in an IP packet in real time and the signaling technology.

For signaling protocols available for IP phones, H.323 methods recommended by ITU-T (International Telecommunication Union-Telecommunication sector) in 1997 and SIP (Session Initiation Protocol) provided as the standard track in RFC 3261, which was standardized by IETF (Internet Engineering Task Force) and issued in 2002, have been implemented. Especially, SIP, in which a message is described in text, is designed on the model of HTTP (Hyper Text Transfer Protocol) for web services and SMTP (Simple Message Transfer Protocol) for electronic mails. As a result, SIP is simple, highly scalable and highly compatible with the Internet and is now becoming the standard of the signaling protocols used in IP phones.

SIP is a signaling protocol for controlling the establishment, change, and disconnection (or termination) of a communication session between a pair of user terminals in an application layer.

The establishment, change and disconnection of a communication session is performed by exchanging a method (or a request message) and a response (response message) between user terminals through a relay server called SIP server deployed over the Internet, in accordance with predetermined steps.

For example, the establishment of a communication session starts from the transmission of INVITE message. The user terminal in SIP (or UA: User Agent) is identified on the basis of the URI (Uniform Resource Identifier) form, such as sip:hanako@fujitsu.com, and sip:taro@fujitsu.com.

By exchanging SIP messages, information on a medium to be used (audio, video or text), information on an encoding method to be used for an audio medium, information on a protocol to be used for transporting the audio packet, a port number to be used, an audio packet transmission cycle and so on are notified.

In a general telephone service, the reaction to the occurrence of a network fault and quick recovery of the service are essential for achieving the customer satisfaction and the reliability for the service. Upon occurrence of a fault, in order to properly respond to expected customer inquiries, to suppress the expansion of the influence, and to recovery the service, it has been desired to quickly grasp the range of influence (for example, influenced users).

In a conventional public switched telephone network: PSTN (Public Switched telephone Network), one line unit provides one communication path, and when a communication error or a congestion is detected, the communication path itself is blocked. Therefore, by checking the block state of the communication path, the range of influence can be identified.

An IP phone is a new form of telephone service and is basically a service based on IP protocol. Therefore, a technology for identifying the fault range on the basis of the concept of the communication path as in PSTN cannot be applicable thereto.

As a result, in reality, the fault detection in the IP phone service has no other choice than to rely on the fault detection method for IP networks. For example, the set of paths where a fault has occurred is identified by measuring the communication quality information on the combinations of all paths constructing the Internet between terminals, in the conventional technology as disclosed in Japanese Laid-open Patent Publication No. 2005-102180.

In the case of an IP network having a tree structure, connection information between network apparatus and user information accommodated in a network apparatus can be managed in association with each other in advance. In the case, when a fault has occurred an area of the network, all users accommodated in an area of the network which is closer to the user side than the area where the fault has occurred may be regarded as influenced by the fault.

In the case of an IP network having a mesh structure, a possible method is to narrow the range of influence by performing a communication test between contraposition area-pair in the network, for example, as disclosed in Japanese Laid-open Patent Publication No. 2005-102180.

SUMMARY

According to an aspect of the invention, in a network including a group of proxy servers for processing a signaling protocol for transferring signaling messages through a communication route connecting a pair of user terminals, a influenced range of a fault occurrence in the network is determined. There is provide with proxy connection information indicative of connection relations between each pair of proxy servers included in the group of proxy servers in association with a direction of a traffic flow therebetween, and a communication session between a pair of user terminals is established by setting a communication route that connects the pair of user terminals and passes through one or more proxy servers included in the group of proxy servers. A signaling message that is received or transmitted by each of the one or more proxy servers is captured, and an abnormal end of the communication session between the pair of user terminals is detected by analyzing the captured signaling message so as to determine a cause section that is a section included in the communication route connecting the pair of user terminals and has caused the detected abnormal end of the communication session. Then, an abnormal session record including information on the abnormally ended communication session and information on the determined cause section is created and accumulated, so as to count the number of abnormally ended communication sessions caused by the cause section on the basis of the accumulated abnormal session records. The influenced range of the fault occurrence in the network is determined on the basis of the counted number of abnormally ended communication sessions caused by each of cause sections and the proxy connection information.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF THE DRAWINGS

FIG. 6 is a diagram illustrating an example of a signaling message, according to an embodiment;

DESCRIPTION OF EMBODIMENTS

As mentioned above, the conventional technology requires the estimation of all path sets in a network to identify the set of paths where a fault has occurred. Therefore, it is unrealistic to apply the conventional technology to a network having an enormous size like the Internet today, for example, an IP phone network that is controlled on the basis of the signaling protocol.

In this way, hitherto, the Internet services, such as an IP phone service based on the signaling protocol, are implemented by using a protocol in which data is transported in packet units, and, even when a fault has occurred in the network, the audio packet is diverted around the fault position and finally reaches the destination. Therefore, in those services, when a network fault has occurred, it is very difficult to precisely determine on peer-to-peer level whether the influence on the service is avoided by diverting the relevant packets into an alternative path, or the service is influenced because the alternative path is busy.

Preferred embodiments of the present invention will be explained with reference to accompanying drawings.

Figure 1:
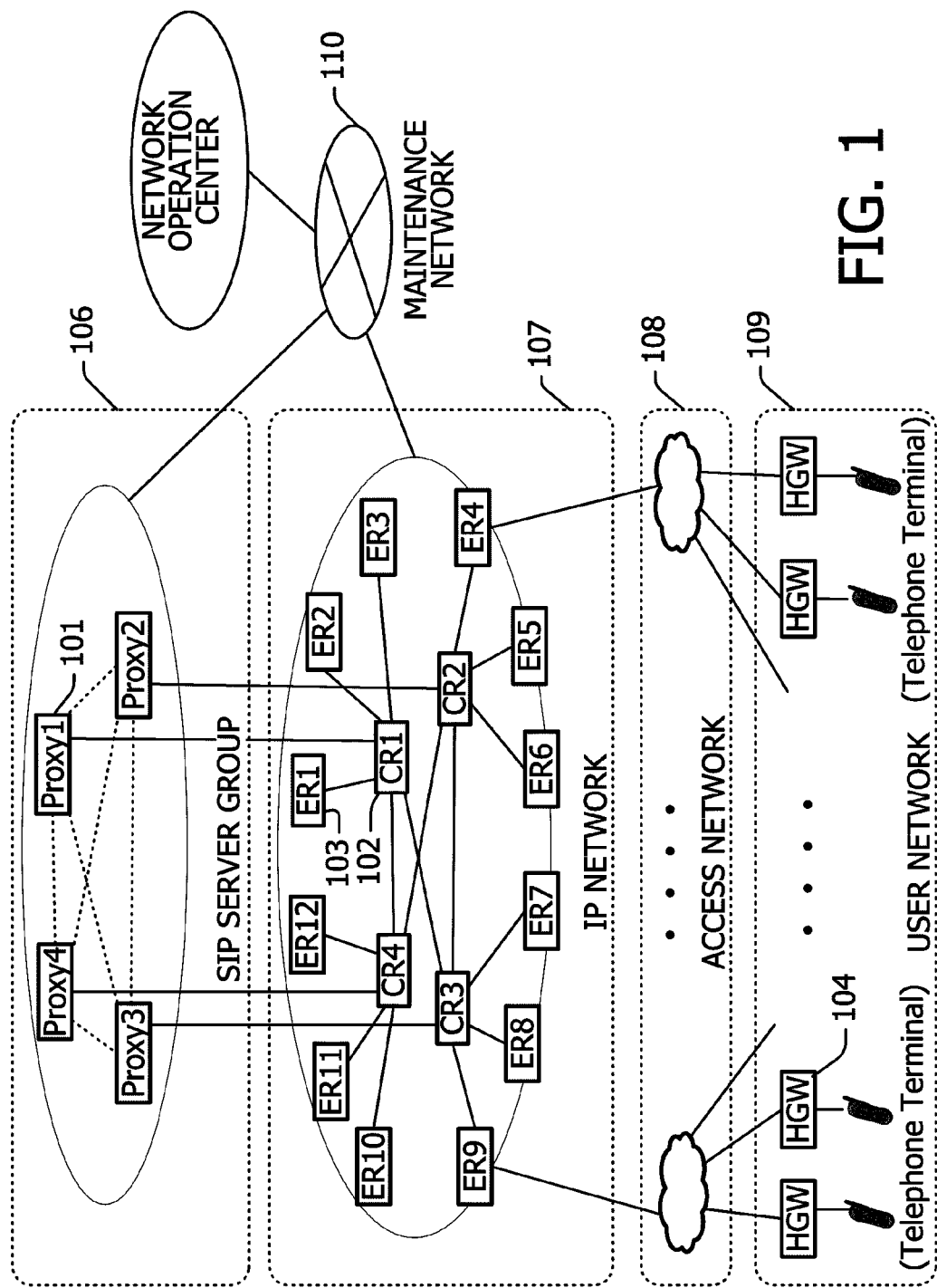
FIG. 1 is a diagram illustrating an example of a network configuration.

FIG. 1 is a diagram illustrating an example of a network configuration providing an IP phone service.

In FIG. 1, Proxy 1 to Proxy 4 are proxy servers 101 (in FIG. 1, reference numeral 101 is depicted only for Proxy 1 as a representative of all the proxy servers) which functions as an SIP server group 106 that relays signaling messages by using SIP as a signaling protocol. CR 1 to CR 4 are core routers 102 (in FIG. 1, reference numeral 102 is depicted only for CR 1 as a representative of all the core routers) constituting an IP network 107 as a backbone network. ER 1 to ER 12 are edge routers 103 (in FIG. 1, the reference numeral 103 is depicted only for ER 1 as a representative of all the edge routers) each of which connects between an access network 108 and the IP network 107. HGW is a home gateway 104 (in FIG. 1, the reference numeral 104 is depicted for only one HGW as a representative of all the home gateways) that accommodates a telephone terminal as an IP phone in a user network 109 within a user residence.

Figure 2:
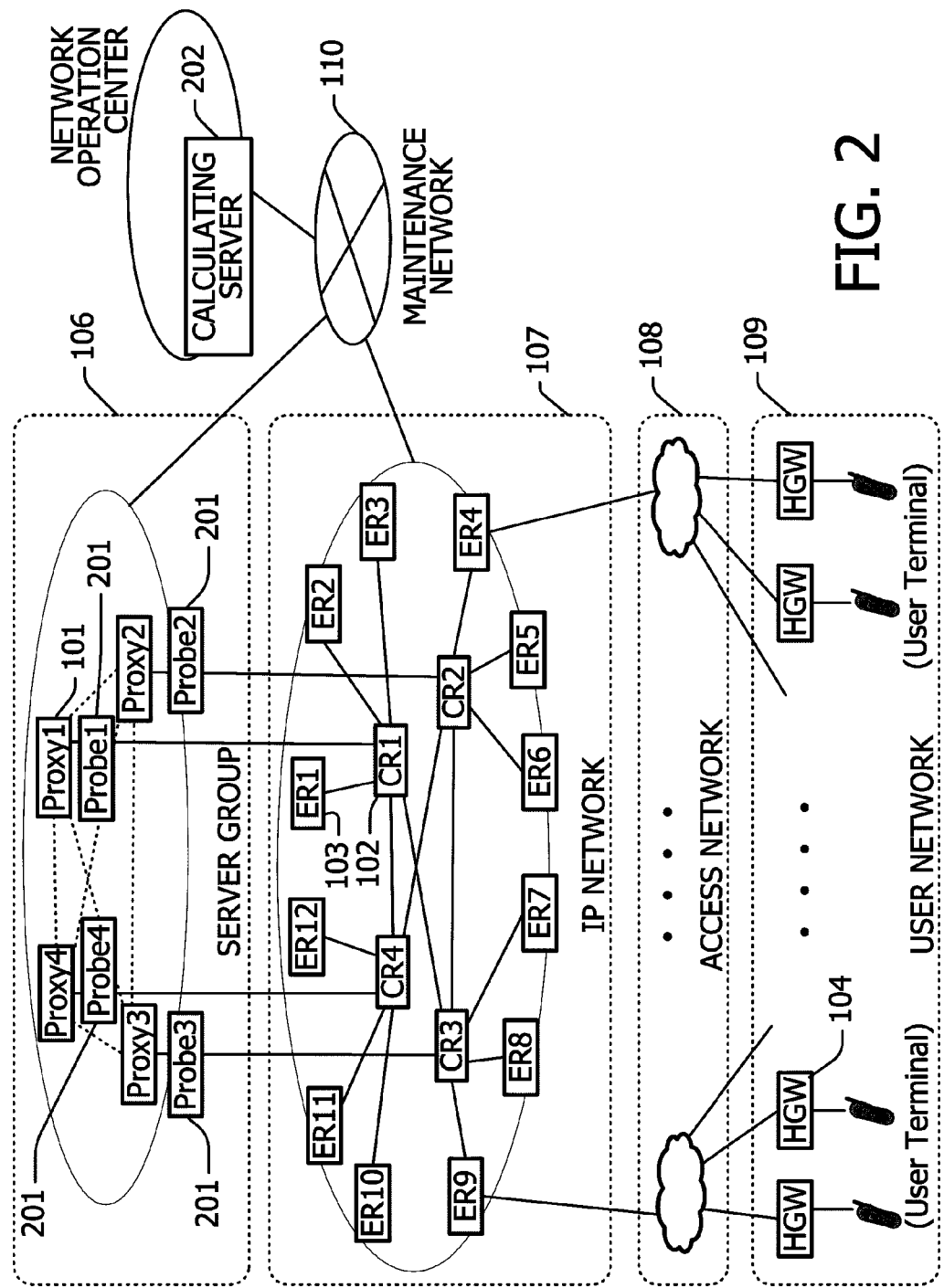
FIG. 2 is a diagram illustrating an example of a network configuration, according to an embodiment.

FIG. 2 is a diagram illustrating an example of a network configuration according to an embodiment.

In FIG. 2, Proxy 1 to Proxy 4 are proxy servers 101 (in FIG. 2, reference numeral 101 is depicted only for Proxy 1 as a representative of all the proxy servers) which functions as a proxy server group 106 that relays signaling messages by using a signaling protocol such as SIP.

In the configuration depicted in FIG. 2, compared with the configuration depicted in FIG. 1, probes 201 (Probe 1 to Probe 4 in FIG. 2) is deployed between proxy servers 101 (Proxy 1 to Proxy 4 in FIG. 2) and core routers 102 (CR 1 to CR 4 in FIG. 2) constituting the IP network 107. A calculating server 202 is deployed in a network operation center connecting to the server group 106 and the network 107 via a maintenance network 110. Therefore, the probes 201 and the calculating server 202 are connected via the maintenance network 110.

Hereinafter, one or more user terminals and a part of the network that are communicably connectable to a proxy server and handled thereby, is defined as a management area corresponding to the proxy server. Hereinafter, "a management area" will be briefly described as "an area", and management areas on a transmitting side and on a receiving side will be described as "a source area" and "a destination area", respectively.

An area code is assigned to each of management areas, and each of proxy servers 101 knows to which proxy server 101 signals irrelevant to the area code assigned thereto are to be transferred.

Each of the proxy servers 101 functions as an so-called outbound proxy server from the viewpoint of user terminals to be handled thereby, and signaling messages between user terminals are always communicated through the proxy server 101 handling the user terminals.

Each of the proxy servers 101 further has a record route function (RFC 3261 loose routing procedure), whereby signals from the start to the end of a communication session always pass through the same sequence of proxy servers 101.

The home gateway device 104 and a proxy server 101 have a session timer function (RFC 4028) and perform a keep-alive operation by transmitting a session refresh request message as a signaling message.

Figure 3:
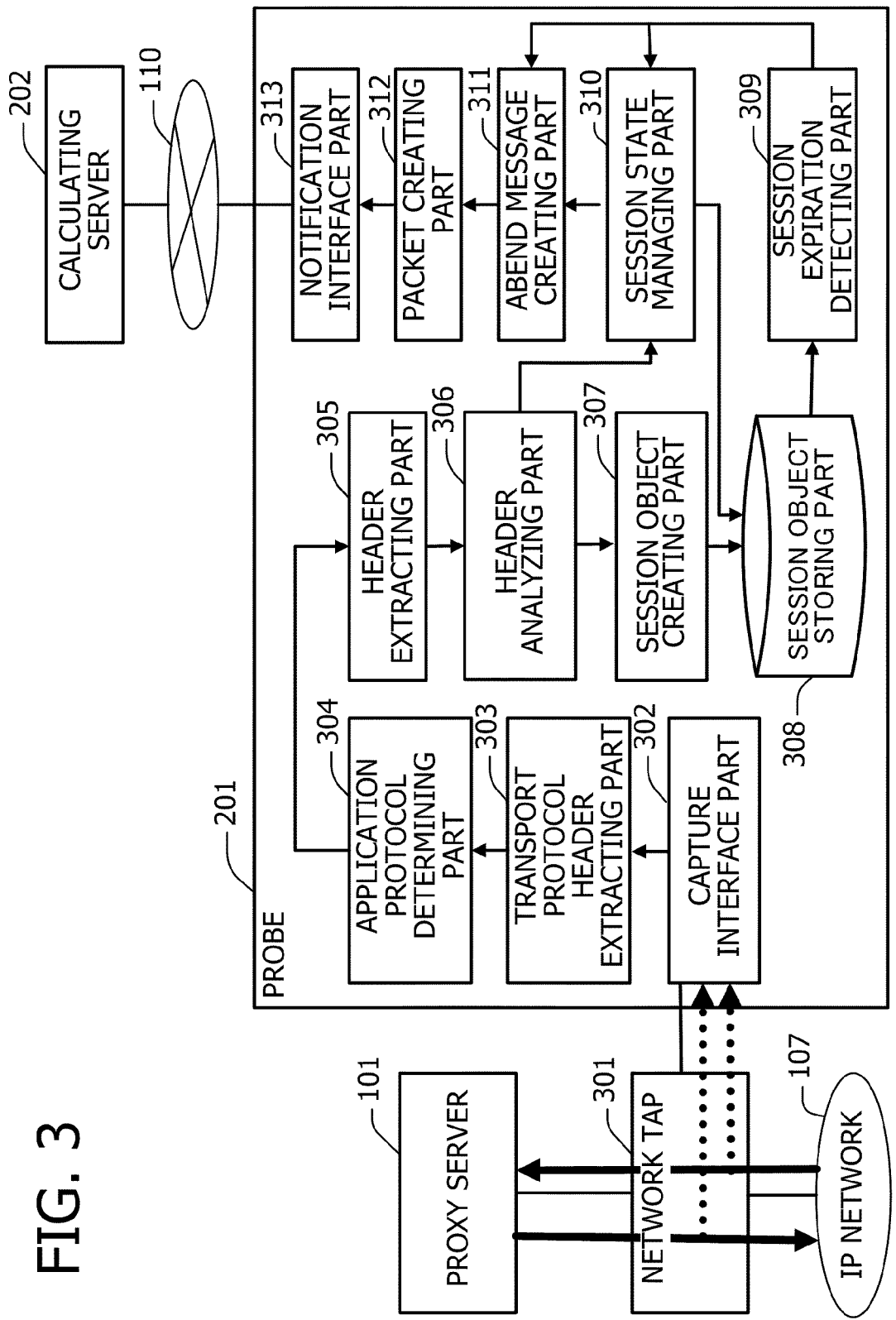
FIG. 3 is a diagram illustrating an example of a configuration of a probe apparatus, according to an embodiment.
Figure 4:
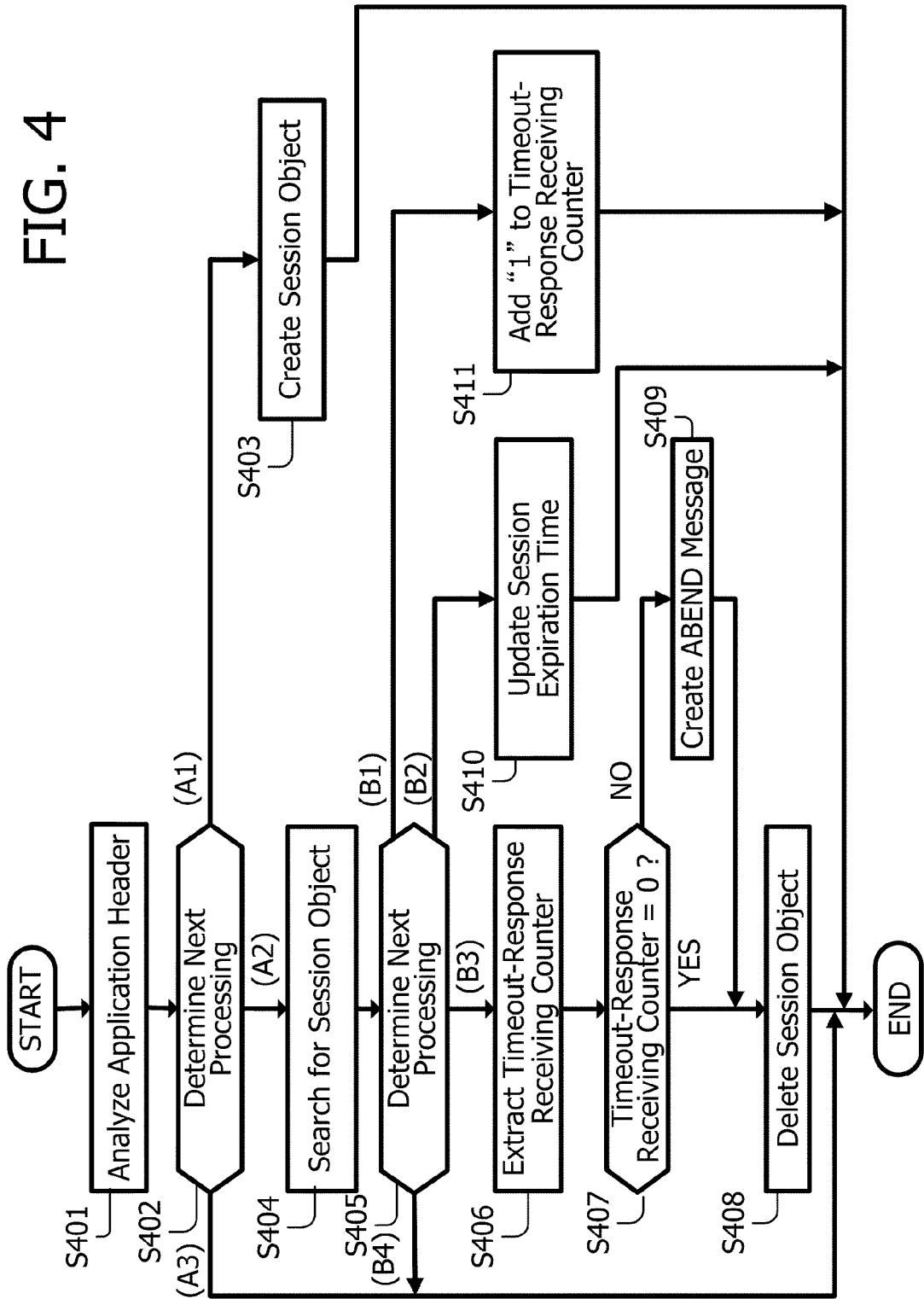
FIG. 4 is a diagram illustrating an example of a flowchart of an operation performed by a probe apparatus, according to an embodiment.

FIG. 3 is a diagram illustrating an example of a configuration of a probe according to an embodiment. FIG. 4 is a diagram illustrating an example of a flowchart of an operation performed by a probe according to an embodiment. In the following description, parts 301 to 313 depicted in FIG. 3 will be described, as needed, in association with steps S401 to S411 depicted in FIG. 4.

A network tap 301 is a device causing a signal (for example, IP packet signal) flowing across a network to branch off, and is connected between an outbound proxy server 101 and the network 107. In the probe 201, a capture interface part 302 receives a packet signal branching off at the network tap 301.

The capture interface part 302 may be connected to a port of a repeater hub connecting the proxy server 101 and the network 107, or to a mirror port of a layer 2 switch, as a network tap 301.

The packet signal is captured by a transport protocol header extracting part 303 through the capture interface part 302, and, here, the transport header of the packet is extracted.

Next, an application protocol determining part 304 identifies whether the destination port number of the transport header is equal to a predetermined port number or not. For example, in the case of SIP, the predetermined port number becomes "5060" (that is, the port number of SIP). When the transport header includes the predetermined port number, for example, "5060", the entire packet (for example, IP packet) is transferred to a header extracting part 305, as a signaling message to be processed.

The header extracting part 305 extracts the application header from the transport payload included in the packet, or the signaling message. Then, a header analyzing part 306 analyzes the application header in step S401 of FIG. 4.

FIG. 6 is a diagram illustrating an example of a signaling message in which an INVITE method used by SIP for starting a communication session is depicted as a representative example of a signaling message. The SIP message has a configuration that is very similar to that of electronic mail data, and includes a header part 601 and a body 602 as depicted in FIG. 6. In the case of SIP, the header part 601 is analyzed by the header analyzing part 306.

In FIG. 6, a reference numeral 611 is a "Supported" header designating a timer option as an extended function of SIP A reference numeral 612 is a "Record-Route" header for recording identifiers of proxy servers via which signaling messages are transferred in a communication route connecting a pair of user terminals. Each of proxy servers on the communication route adds the identifier thereof to this Record-Route header. A reference numeral 613 is a "Session-Expires" header for designating an interval between sessions, and a reference numeral 614 is a "Min-SE" header for designating the minimum timer value.

Next, the header analyzing part 306 determines the processing to be next performed on the basis of the result of the analysis (in step S402 of FIG. 4). The header analyzing part 306 transfers the application header to a session object creating part 307 (from S402 to step S403) when a predetermined condition A1 is true in the extracted application header (A1 in step S402). In the case of SIP, the predetermined condition A1 is that the following four conditions (1) to (4) are all true in the extracted SIP header.

(1) The initial line is 200 OK response.
(2) The Via header has two lines.
(3) The second line of the Record-Route header includes the URI of the outbound proxy server to which the probe is connected.
(4) The method name of the CSeq header is "INVITE".

The header analyzing part 306 transfers the application header to the session state managing part 310 when a predetermined condition A2 is true in the extracted application header (A2 in step S402). In the case of SIP, the predetermined condition A2 is that the following condition (5) is true, the following two conditions (6) and (7) are both true, or the following three conditions (8) to (10) are all true, in the extracted SIP header.

(5) The initial line is BYE.
(6) The initial line is an UPDATE request.
(7) There is the Session-Expires header.
(8) The initial line is 408 Response Timeout.
(9) The Via header has one line.
(10) The method name of the CSeq header is "UPDATE".

When neither the predetermined conditions A1 nor A2 are true (A3 in step S402), the header analyzing part 306 ends the processing for the signaling message captured by the probe 201.

A session object creating part 307 creates a session object on the basis of the information included in the transferred application header (in step S403 of FIG. 4), and stores the created session object into a session object storing part 308. For example, the session object includes the following attribute information (11) through (15):

(11) a session ID attribute that is, for example, created by combining the From header, the To header, and the Call-ID header in the case of SIP;
(12) a route attribute that is, for example, created by connecting the URIs of the proxy server apparatus 101 included in the Record-Route header with adding the URI of the home gateway device 104 at the beginning and end of the connected URIs in the case of SIP;
(13) a session starting time attribute that is b, for example, created by setting the current time;
(14) a session expiration time attribute that is, for example, created by adding a predetermined refreshing time period to the current time, wherein a value included in the Session-Expires header can be used as the predetermined refreshing time period in the case of SIP; and
(15) a timeout-response receiving counter attribute that is, for example, created by setting a counter value of "0".

First, the session state managing part 310 searches the session object storing part 308 for a session object having the session ID attribute matching with predetermined attribute information included in the transferred application header (in step S404 of FIG. 4). In the case of SIP, the predetermined attribute information can be generated by combining the From header, the To header, and the Call-ID header, as depicted in FIG. 6.

Next, the session state managing part 310 determines the processing to be next performed on the basis of the search result (in step S405 of FIG. 4). When the searching has failed (B4 in step S405)., the session state managing part 310 terminates the processing for the signaling message captured by the probe 201

When the searching has succeeded and the transferred application header indicates a signaling message for terminating the communication session (B3 in step S405), the session state managing part 310 extracts the timeout-response receiving counter attribute value from the session object obtained at the step S404 (in step S406). In the case of SIP, the signaling message for terminating the communication session is a BYE message. Then, the session state managing part 310 checks the extracted timeout-response receiving counter attribute value to determine the processing to be next performed (in step S407). Here, the timeout-response receiving counter attribute value indicates the number of received request timeout messages that are transmitted from a proxy server when the proxy server does not receive a response message within a predetermined time period after transmitting a session refresh request message for requesting refresh of the communication session.

When the number of received request timeout messages registered in the timeout-response receiving counter attribute is "0" (YES in step S407), the session state managing part 310 deletes the session object obtained at the step S404 from the session object storing part 308 (in step S408). After that, the session state managing part 310 terminates the processing for the signaling message captured by the probe 201.

When the number of received request timeout messages registered in the timeout-response receiving counter attribute is "one or more" (NO in step S407), the session state managing part 310 requests an ABEND message creating part 311 to create an abnormal end message (ABEND message) regarding the session object obtained at the step S404 (in step S409), and deletes the session object from the session object storing part 308 (in step S408). Then, the session state managing part 310 terminates the processing for the signaling message captured by the probe 201.

When the searching has succeeded and the transferred application header indicates a signaling message for requesting refresh of the communication session, that is, a session refresh request message (B2 in step S405), the session state managing part 310 updates the value of the session expiration time attribute (refer to (14) above) in the session object obtained at the step S404 (in step S410). For example, in the case of SIP, a session refresh request message is a UPDATE message which is identified by the initial line of the transferred SIP header being "UPDATE", and the current value is replaced with the time obtained by adding the value in the Session-Expires header included in the transferred SIP header and the current time. After that, the session state managing part 310 terminates the processing for the signaling message captured by the probe 201.

When the searching has succeeded and the transferred application header indicates a request timeout message, which indicates that the proxy server that transferred a session refresh request message has not received within the predetermined response time a response message thereto (B1 in step S405), the session state managing part 310 adds one to the timeout-response receiving counter in the session object obtained at the step 404 (in step S411). For example, in the case of SIP, a request timeout message can be identified by the initial line of the transferred SIP header being "408 Response Timeout". After that, the session state managing part 310 terminates the processing for the signaling message captured by the probe 201.

Next, the operation by the session expiration detecting part 309 will be described with reference to the operation flowchart depicted in FIG. 5.

Figure 5:
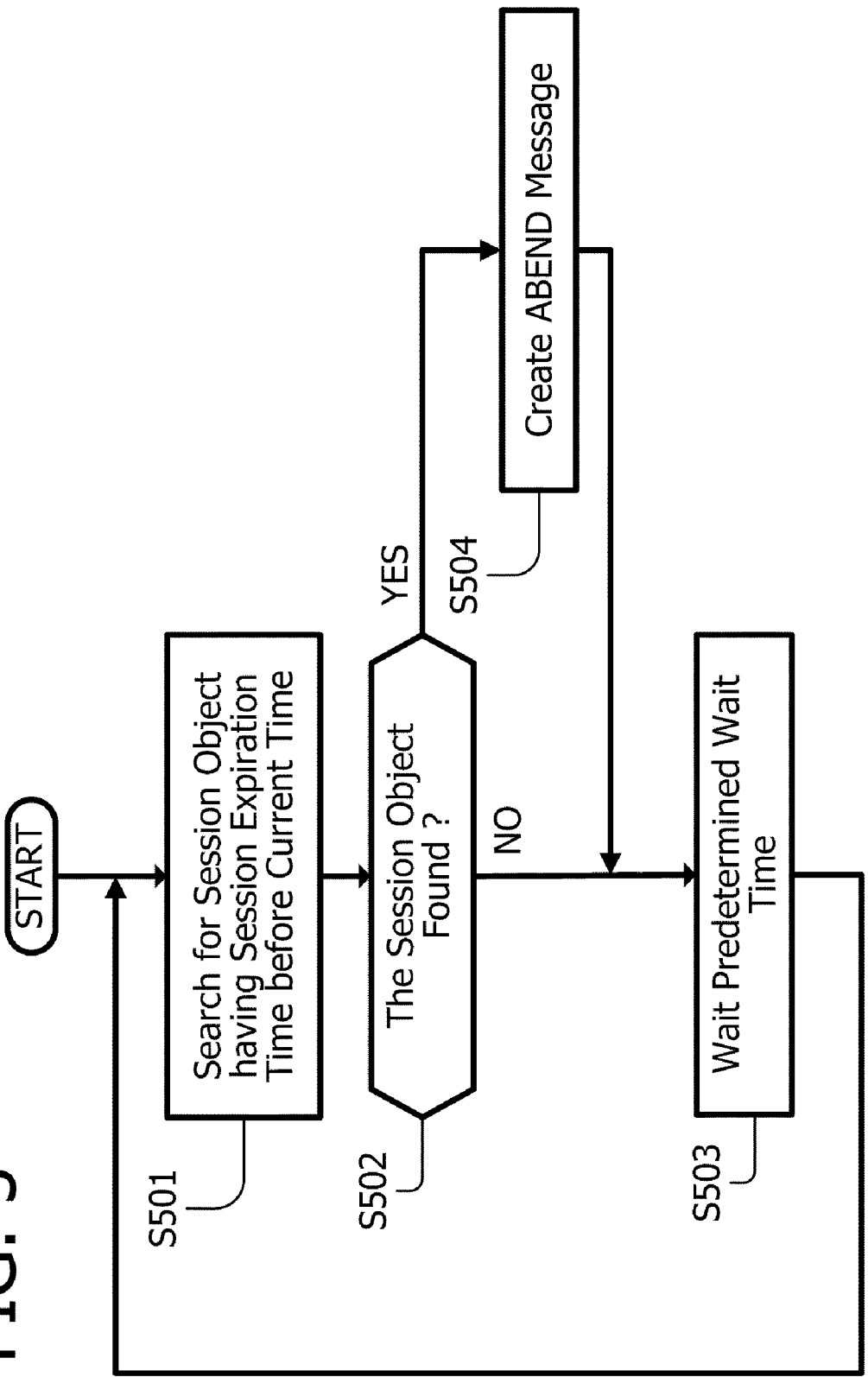
FIG. 5 is a diagram illustrating an example of a flowchart of an operation performed by a probe apparatus, according to an embodiment.

The session expiration detecting part 309 periodically searches the session objects registered in the session object storing part 308 for a session object having, as a session expiration time attribute (refer to (14) above), a time value before the current time (in step S501 of FIG. 5), while waiting a predetermined wait time (in step S503 of FIG. 5).

When the desired session object is found (YES in step S502), the session expiration detecting part 309 requests the ABEND message creating part 311 to create the abnormal end message (ABEND message) regarding the session object (in step S504 of FIG. 5), and requests the session state managing part 310 to delete the session object from the session object storing part 308. In response thereto, the session state managing part 310 deletes the session object from the session object storing part 308.

Last, the operation performed by the ABEND message creating part 311 will be described.

As described above, when the session state managing part 310 receives a signaling message for terminating the communication session corresponding to a session object stored in the session object storing part 308 and having the timeout-response counter attribute value of one or more, or when the session expiration detecting part 309 detects a session object stored in the session object storing part 308 and having the session expiration time attribute value of a time before the current time, the ABEND message creating part 311 is requested to create an abnormal end message (an ABEND message) corresponding to the session object.

The ABEND message creating part 311 creates the ABEND message including, for example, the following abnormal end information (16) to (21), on the basis of information on its own probe 201, information included in the session object that is notified from the session state managing part 310 or the session expiration detecting part 309, and the notification time thereof. The created ABEND message is processed by the packet creating part 312 and the notification interface part 313, and then transmitted to the calculating server 202 through the maintenance network 110.

Abnormal End Information:

(16) an area code of proxy server 101 to which the own probe 201 is connected;

(17) a source user terminal identifier extracted from the session ID attribute (refer to (11) above) of the notified session object, in the case of SIP, a source telephone number extracted from the URI of the From header included in the session ID attribute (refer to the lines of the FROM header included in the header part 601 in FIG. 6);

(18) a destination user terminal identifier extracted from the session ID attribute of the notified session object, in the case of SIP, a destination telephone number extracted from the To header of the URI included in the session ID attribute (refer to the lines of the To header included in the header part 601 in FIG. 6);

(19) a session starting time attribute value (refer to (13) above);

(20) an abnormal end detection time, that is, the notification time from the session state managing part 310 or the session expiration detecting part 309; and

(21) information on the cause section that can be determined by the route attribute value (refer to (12) above) and the timeout-response receiving counter attribute value (refer to (15) above).

Figure 7:
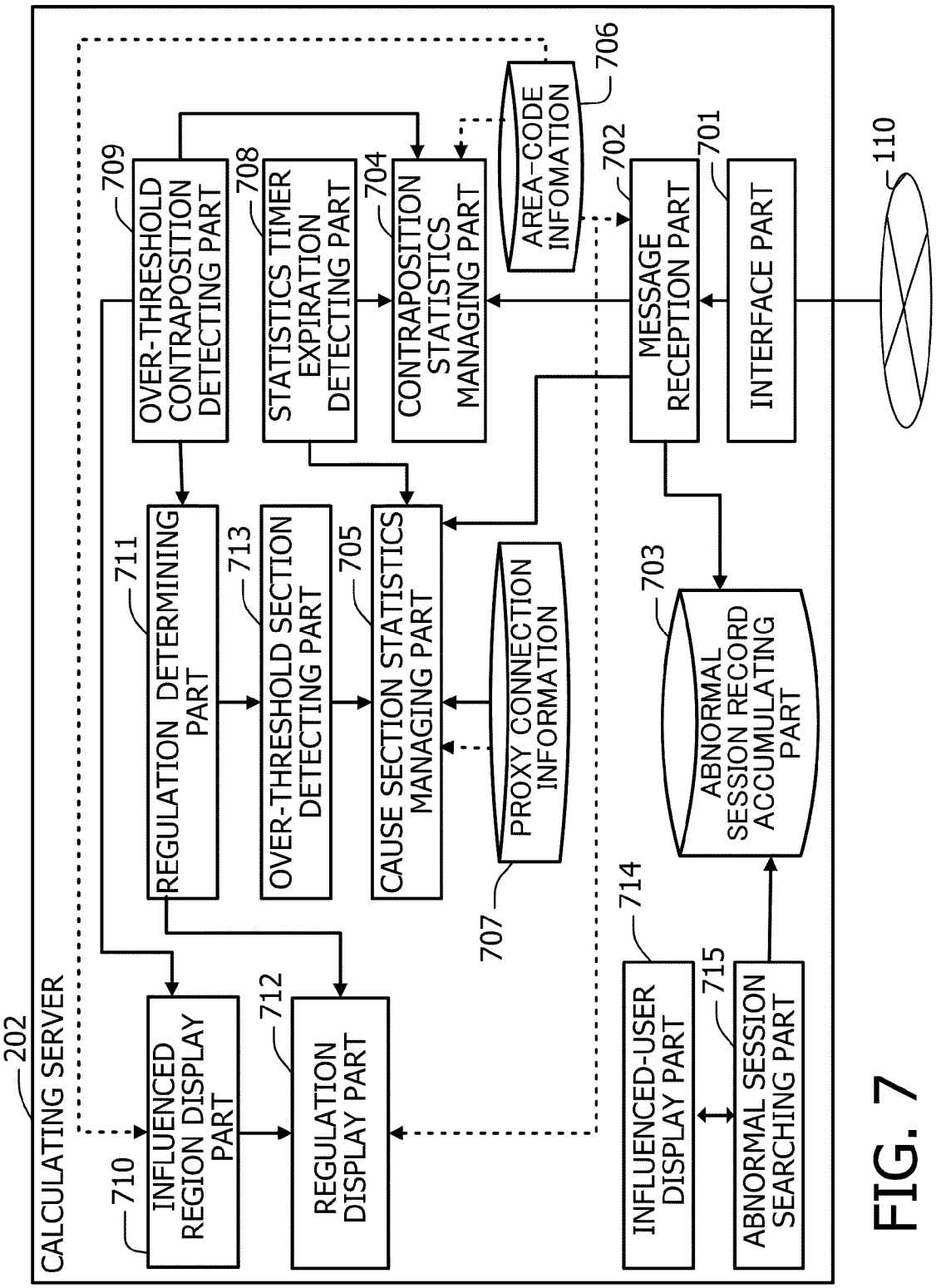
FIG. 7 is a diagram illustrating an example of a configuration of a calculating server, according to an embodiment.

FIG. 7 is a diagram illustrating an example of a configuration of a calculating server, according to an embodiment.

The abnormal end message (ABEND message) transmitted from the probe 201 is received by a message reception part 702 through an interface part 701.

The message reception part 702 determines, for example, the following information (22) to (30) as abnormal session information, on the basis of the abnormal end information ((16) to (21) as mentioned above) included in the received ABEND message and area-code information 706, and distributes the determined abnormal session information to the abnormal session record accumulating part 703, contraposition statistics managing part 704, and cause section statistics managing part 705. The abnormal session record accumulating part 703 accumulates the distributed abnormal session information as an abnormal session record.

Abnormal Session Information:

(22) a source user terminal identifier, for example, a source telephone number;
(23) a destination user terminal identifier, for example, a destination telephone number;
(24) an identifier of source proxy server 101;
(25) an identifier of destination proxy server 101;
(26) a source area-code;
(27) a destination area-code;
(28) a session starting time;
(29) an abnormal end detection time; and
(30) an identifier of a cause section.

An contraposition statistics managing part 704 holds two-dimensional array data (which is substantially three-dimensional XYZ array data assuming that numbers in time series are put on Z-axis, or the third element index) that stores a time series list of abnormal session information, as an element value thereof. The two-dimensional array has the destination area-code/the name of destination proxy server 101 on the X-axis (the first element index) and the source area-code/the name of source proxy server 101 on the Y-axis (the second element index). When receiving the abnormal session information from the message reception part 702, the contraposition statistics managing part 704 identifies the X-axis value and the Y-axis value from the source area-code and destination area-code included therein, and adds the received abnormal session information to the end of the time series list that is the element value corresponding to the identified X- and Y-axis values of the two-dimensional array data.

A cause section statistics managing part 705 holds linear array data (which is substantially YX-two-dimensional array data assuming that numbers in time series are put on X-axis, or the second element index) storing a time series list of the abnormal session information as a element value thereof. The linear array data has proxy server connection information for each traffic direction on the Y-axis (first element index), which is obtained from the proxy connection information 707 including section information for each direction of traffics between proxy servers 101 or between proxy server 101 and HGW (home gateway) 104. Then, when receiving the abnormal session information from the message reception part 702, the cause section statistics managing section 705 identifies the Y-axis value (the first element index), or section information, from the identifier of the cause section included therein, and adds the received abnormal session information to the end of the time series list that is the element value corresponding to the identified Y-axis value of the linear array data.

A statistics timer expiration detecting part 708 periodically checks whether or not the abnormal end detection time included in each abnormal session information stored in a time series list is before a expiration time obtained by subtracting the statistics information valid time (T1) from the current time, for each time series list constituting an element value of the two-dimensional array data held by the contraposition statistics managing part 704 and for each time series list constituting an element value of the linear array data held by the cause section statistics managing part 705. When detecting the abnormal session information including the abnormal end detection time before the obtained expiration time, the statistics timer expiration detecting part 708 transmits a request for deleting the corresponding abnormal session information, to both the contraposition statistics managing part 704 and the cause section statistics managing part 705. The contraposition statistics managing part 704 and the cause section statistics managing part 705 delete the corresponding abnormal session information.

An over-threshold contraposition detecting part 709 periodically counts the number of pieces of abnormal session information included in each time series list constituting an element value of two-dimensional array data held by the contraposition statistics managing part 704, so as to obtain a contraposition abnormal session count that is the number of pieces of abnormal session information included in the each time series list. The over-threshold contraposition detecting part 709 further creates two-dimensional array data that has the destination area-code/the name of destination proxy server 101 on the X-axis (the first element index) and the source area-code/the name of source proxy server 101 on the Y-axis (the second element index) like one held by the inter-area statistics managing part 704, and stores, as an element value thereof, the contraposition abnormal session count and the result of the determination on whether the contraposition abnormal session count stored in the intersection cell between the corresponding first and second element indexes, exceeds a predetermined contraposition threshold value or not. Then, the over-threshold contraposition detecting part 709 transmits the created two-dimensional array data to the influenced region display part 710, and further transmits the created two-dimensional array data to the regulation determining part 711 when detecting therein one or more contraposition abnormal session counts exceeding the predetermined contraposition threshold value.

An over-threshold section detecting part 713 periodically counts the number of pieces of abnormal session information included in each time series list constituting an element value (representing section information) of the linear array data held by the cause section statistics managing part 705, so as to obtain a section abnormal session count that is the number of pieces of abnormal session information included in the each time series list. Then, the over-threshold section detecting part 713 creates linear array data that has the proxy server connection information (or section information) for each traffic direction on the Y-axis (the first element index) like one held by the cause section statistics managing part 705, and stores the section abnormal session count and the result of the determination on whether the section abnormal session count exceeds a predetermined section threshold value or not, as an element value thereof.

Upon receiving two-dimensional array data from the over-threshold contraposition detecting part 709, a regulation determining part 711 selects an element value exceeding the predetermined contraposition threshold value from the received two-dimensional array data, and determines whether there exists an over-threshold section on a communication route connecting the pair of the source area and the destination area corresponding the selected element value in the received two-dimensional array data. Here, the over-threshold section is such a section that the number of abnormal sessions caused thereby exceeds a predetermined section threshold value, and can be determined by sequentially tracing element values (or section information) in the linear array data held by the over-threshold section detecting part 713, in the direction from the element value (section information) corresponding to the source area of the selected element value in the received two-dimensional array data toward the element value (section information) corresponding to the destination area of the selected element value of the received two-dimensional array data. When there exists the over-threshold section on the communication route connecting the pair of the source area and the destination area indicated by the selected element value of the two-dimensional array, the regulation determining part 711 transmits contraposition area-code information (indicating the corresponding source area-code/destination area-code) and section information corresponding to the over-threshold section, to the regulation display part 712.

The influenced region display part 710 creates, on the basis of the two-dimensional array data received from the over-threshold contraposition detecting part 709 and with reference to the area-code information 706, a contraposition abnormal session count display table 801 in which the columns thereof are labeled with a destination area-code/a name of destination proxy server 101, the rows thereof are labeled with a source area-code/a name of the source proxy server 101, and the number of abnormal sessions between contraposition area-pair, that is, a source area and a destination area, is stored in the intersection cell of the pair of the area-codes each corresponding to the source area and the destination area, respectively. Then, the influenced region display part 710 displays the contraposition abnormal session count display table with the cell having an over-threshold value highlighted. Every time receiving the two-dimensional array data from the over-threshold contraposition detecting part 709, the influenced region display part 710 updates the number of abnormal sessions stored in the contraposition abnormal session count display table 801, and transmits a refresh request to the regulation display part 712. The display format of the influenced region display part 710 may be, for example, a topology map format instead of a table format.

The regulation display part 712 displays the name of the source proxy server 101/source area-code, the name of the destination proxy server 101/destination area-code, and information on a fault occurrence section, on the basis of area-code information 706, contraposition area-code information (or source area-code/destination area-code) received from the regulation determining part 711, and section information received from the regulation determining part 711.

An influenced-user display part 714 requests an abnormal session searching part 715 to search the abnormal session record accumulating part 703 for one or more abnormal session records matching given search keys including the source and destination area-codes, and the session starting and ending times. Then, the influenced-user display part 714 displays information obtained by the abnormal session searching part 715, such as a source user terminal identifier and a destination user terminal identifier included in the obtained abnormal session records, as information on users influenced by a fault occurrence in the network.

According to the embodiment having the configurations and functions as mentioned above, a description will be given below on an operation example in which the probe 201 detects an abnormal end of a communication session and the calculating server 202 determines a range of the network to be regulated.

Figure 8:
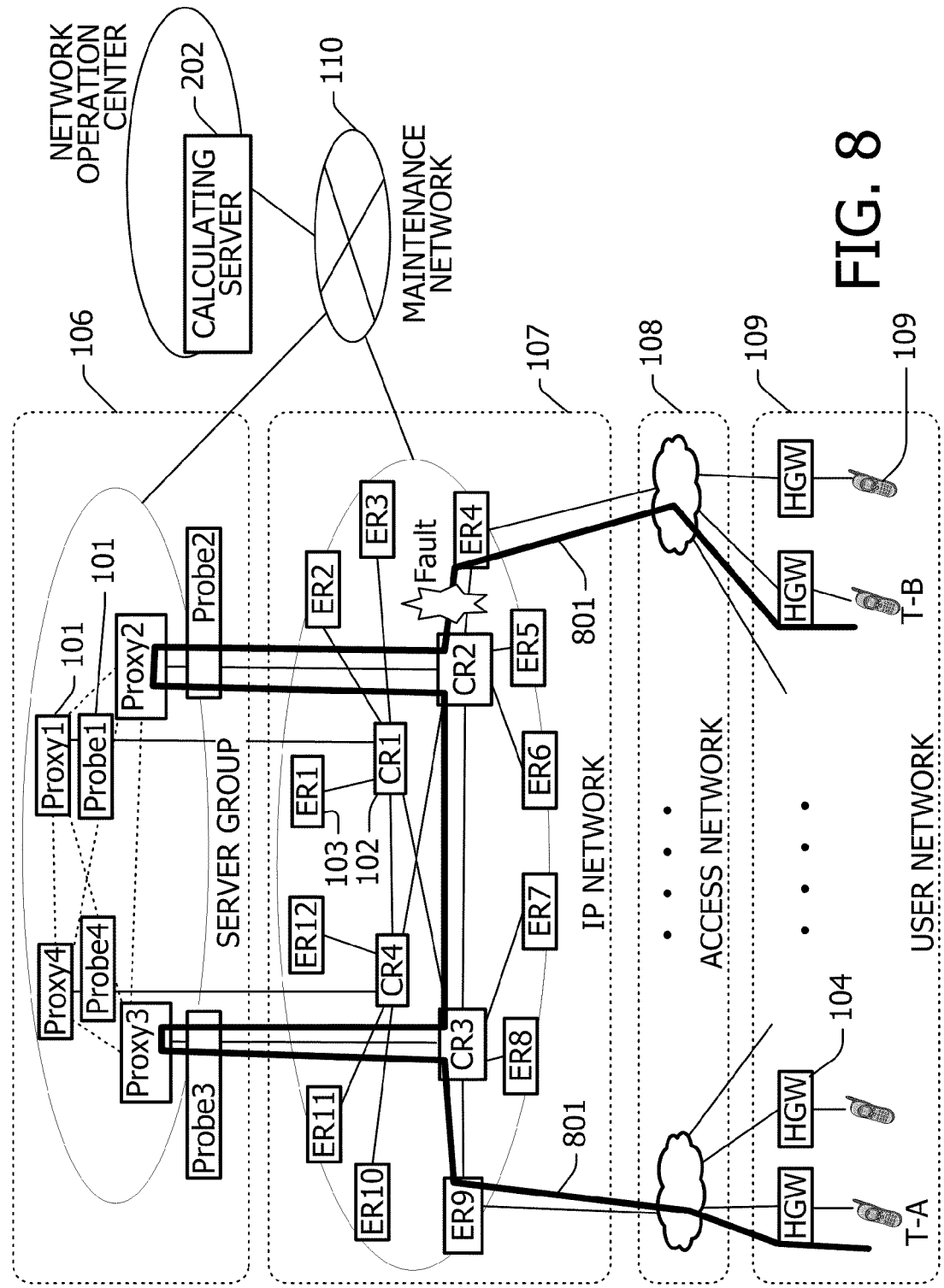
FIG. 8 is a schematic diagram illustrating en example of a flow of signaling messages in a network, according to an embodiment.

FIG. 8 is a schematic diagram illustrating en example of a flow of signaling messages in a network, according to an embodiment The thick line 801 in FIG. 8 represents an example of a flow of signaling messages between user terminal A (source terminal) and B (destination terminal) when a communication session between the user terminals A and B has been cut due to a fault occurrence between a CR2 (core router 102) and an ER4 (edge router 103)

Figure 9:
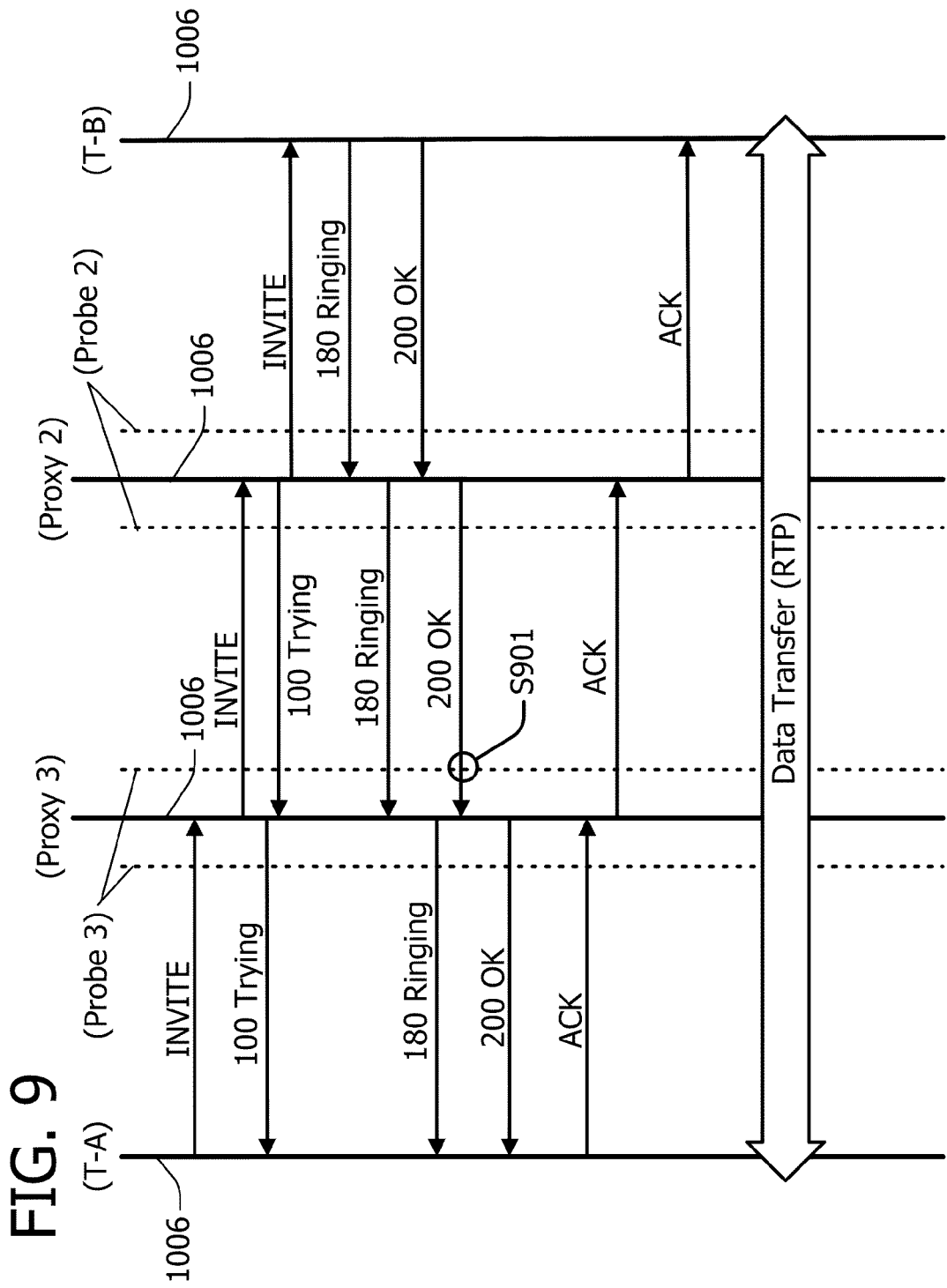
FIG. 9 is a diagram illustrating an example of a message sequence when connecting between telephone terminals A and B, according to an embodiment.

FIG. 9 is a diagram illustrating an example of a signaling message sequence when establishing a communication session between user terminals A and B, according to an embodiment. In FIG. 9, user terminals A and B are denoted by "T-A" and "T-B", respectively, and a sequence of signaling messages according to a SIP is depicted as a representative example. Probe 3 creates a session object and starts managing the session state in response to receiving the OK response to the INVITE message (at S901), from the user terminal B. At that time, probe 3 can recognize a communication route (a SIP route, in the case) between the user terminals A and B from the Record-Route header included in the SIP message (refer to FIG. 6).

Figure 10:
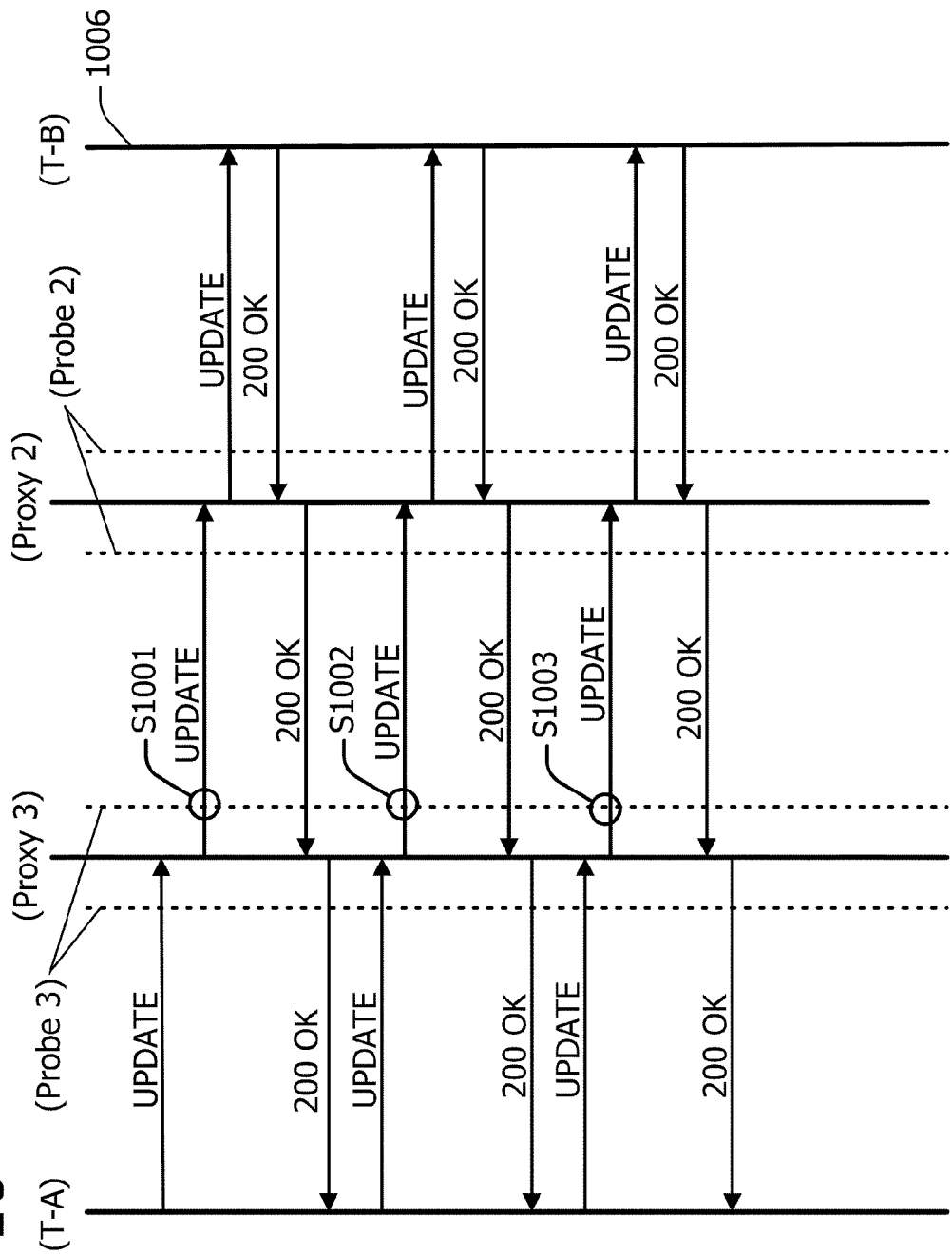
FIG. 10 is a diagram illustrating an example of a message sequence when performing a session refresh during a communication between a pair of user terminals, according to an embodiment.

FIG. 10 is a diagram illustrating an example of a signaling message sequence when performing a session refresh during a communication between user terminals A and B, according to an embodiment. In FIG. 10, a sequence of signaling messages according to a SIP is depicted as a representative example. Every time receiving an UPDATE message for requesting a session refresh, probe 3 updates the session expiration time attribute (refer to (14) above) of the corresponding session object stored in the session object storing part 308 (at S1001, S1002, and S1003 in FIG. 10).

Figure 11:
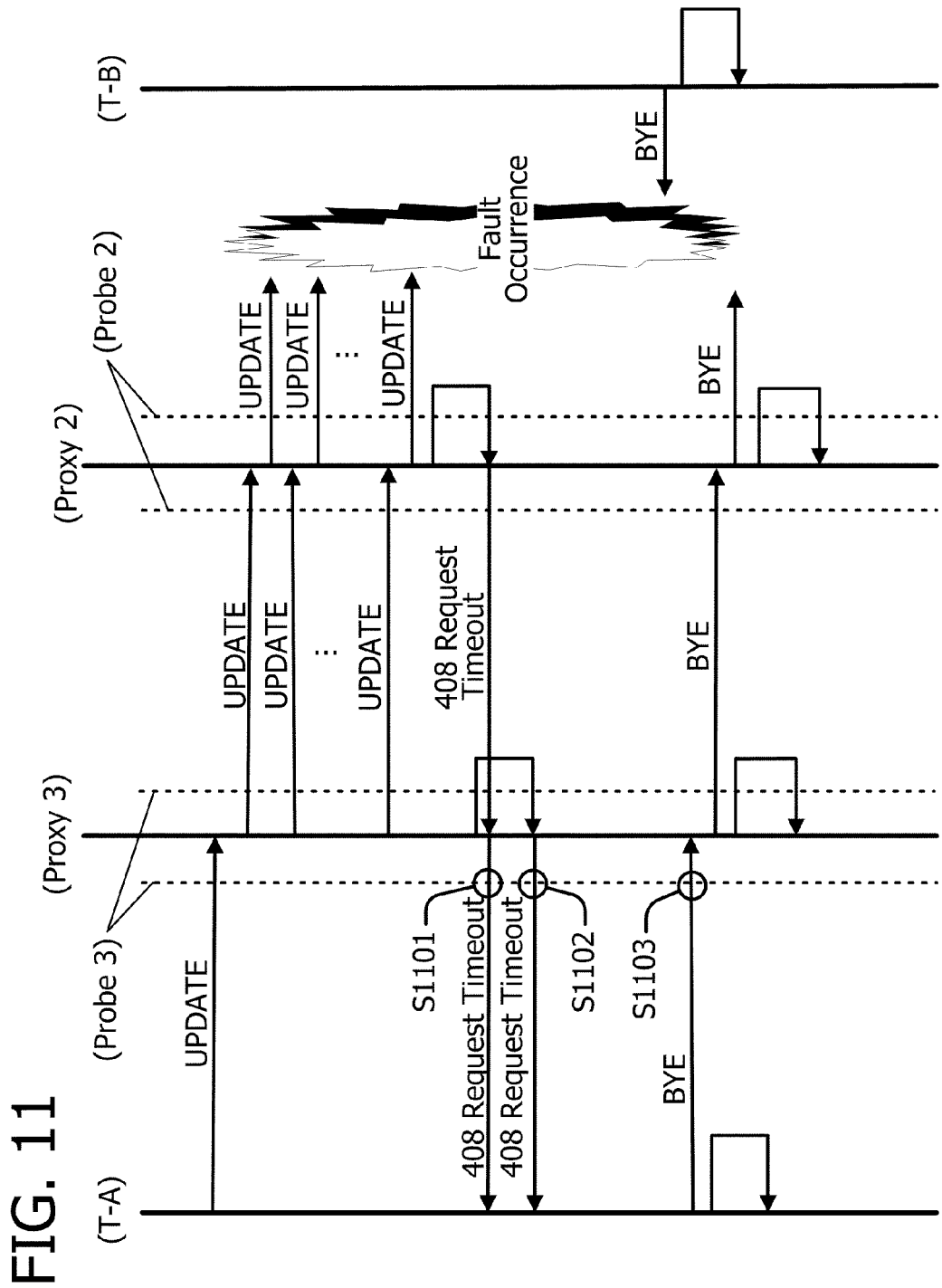
FIG. 11 is a diagram illustrating an example of a message sequence when a fault has occurred in a network, according to an embodiment.

FIG. 11 is a diagram illustrating an example of a signaling message sequence when a fault has occurred in a network. In FIG. 11, a sequence of signaling messages according to SIP is depicted as a representative example. In the example of FIG. 11, the fault has occurred between the CR2 and the ER4 depicted in FIG. 8 during a communication between user terminals A and B.

When transferring a session refresh request message to the user terminal B (T-B in FIG. 11), Proxy 2 (proxy server 101) detects timeout due to an interruption of communication caused by a fault occurrence, and returns a request timeout message (in the case of SIP, 408 request timeout) to Proxy 3 (proxy server 101).

Proxy 3 also detects timeout because any responses have not been received from Proxy 2 within a predetermined response time, and then transmits a request timeout message to the user terminal A (at S1101 of FIG. 11). Further, Proxy 3 transfers, to the user terminal A, the request timeout message received from Proxy 2 a short time later (at S1102). As a result, probe 3 (probe 201) receives two request timeout messages (at S1101 and S1102).

Upon receiving a request timeout message, the user terminal A transmits a BYE message for terminating the communication session to the Proxy 3. When Probe 3 receives the BYE message (at S1103), a session state managing part 310 thereof (FIG. 3) confirms that the timeout-response receiving counter attribute of the session object corresponding to the received BYE message has a value of one or more, "2" in this case (in step S406, S407, and S409 of FIG. 4). Then, the ABEND message creating part 311 of FIG. 3 creates an ABEND message indicating that the section "Proxy 2-HGW", which is two hops away from the beginning section "HGW-Proxy 3" on the communication route designated by the route attribute "HGW-Proxy 3-Proxy 2-HGW", is the cause section (refer to (21) above), and transmits the created ABEND message to the calculating server 202 (depicted in FIG. 2 and FIG. 7) (in step S409 of FIG. 4).

Figure 12:
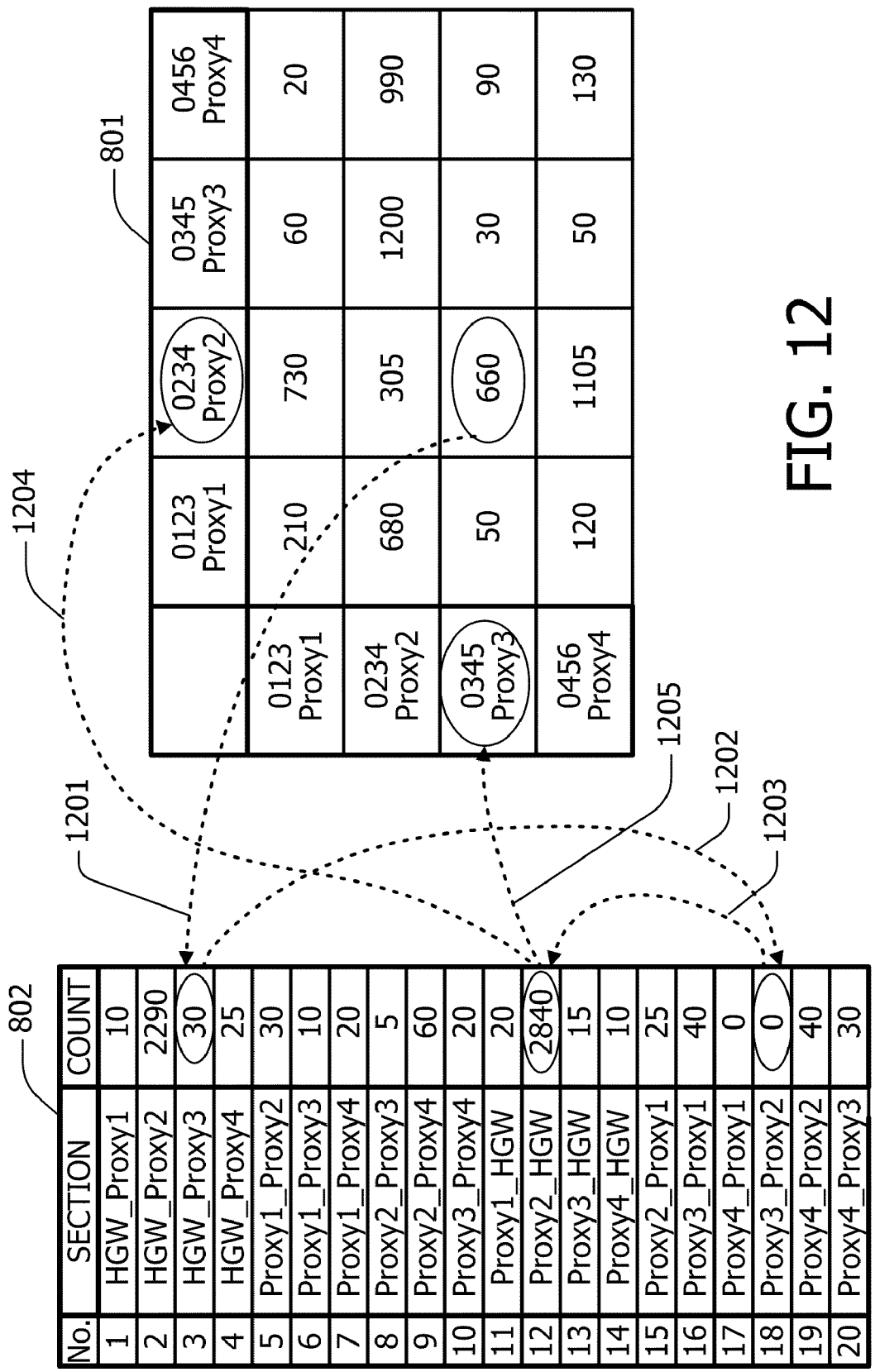
FIG. 12 is a schematic diagram illustrating an example of an operation for determining an influenced range of a fault occurrence in a network, according to an embodiment.

FIG. 12 is a schematic diagram illustrating an example of an operation for determining an influenced range of a fault occurrence in a network, according to an embodiment. In FIG. 12, an contraposition abnormal session count display table 801 handled by the influenced region display part 710 of a calculating server 202 (depicted in FIG. 7) and a linear array data 802 handled by an over-threshold section detecting part 713 are depicted in association with operating steps S1201 to S1205 for determining an influenced range of a fault occurrence in a network.

The contraposition abnormal session count display table 801, as mentioned in the description on the influenced region display part 710, has columns labeled with a destination area-code/a name of destination proxy server 101 and rows labeled with a source area-code/a name of the source proxy server 101, and stores an contraposition abnormal session count that is the number of abnormal sessions between contraposition area-pair (or between a source management area and a destination management area), in the intersection cell corresponding to the pair of source area-code and destination area-code. Here, a cell having a contraposition abnormal session count exceeding an predetermined contraposition threshold value is highlighted, thereby allowing the operator of the calculating server 202 to easily recognize that a fault has occurred between the contraposition area-pair corresponding to the highlighted cell, for example, between the contraposition area-pair of source Proxy 3/(code) 0345 and destination Proxy 2/(code) 0234 as depicted in FIG. 12.

As mentioned in the description on the over-threshold section detecting part 713, the linear array data 802 records, as an element value thereof, the information (denoted by the item "COUNT" in FIG. 12) indicating the number of abnormal sessions and the presence of over-threshold in association with section information (denoted by the item "SECTION" in FIG. 12) for each traffic direction. The item "No." in the linear array data 802 in FIG. 12 is given for convenience in understanding the operation.

In the example depicted in FIG. 12, the value "500" is set as a predetermined contraposition threshold value that is a threshold value of the number of abnormal sessions for determining an influenced range of a fault occurrence on the basis of the contraposition abnormal session count display table 801, and the value "1000" is set as a predetermined session threshold value that is a threshold value of the number of abnormal sessions for determining an influenced range of a fault occurrence on the basis of the linear array data 802.

The ABEND message transmitted from each of probes 201, as described above, is transferred to the contraposition statistics managing part 704 of the calculating server 202. Then, the over-threshold contraposition detecting part 709 counts the number of abnormal sessions stored in the intersection cell between the contraposition area-pair of the source Proxy 3 and the destination Proxy 2, included in the two-dimensional array data held by the contraposition statistics managing part 704. When the number of abnormal sessions stored in an intersection cell exceeds the predetermined contraposition threshold value (in the case, "500"), the contraposition area-pair corresponding to the intersection cell is determined to be an over-threshold contraposition area-pair, and information thereon is transferred to the regulation determining part 711.

The above mentioned ABEND message is further transferred to the cause section statistics managing part 705. The over-threshold section detecting part 713 counts the number of abnormal sessions for each of sections along a communication route between the contraposition area-pair, in the case, from the area of source Proxy 3 to the area of destination Proxy 2, and the section between Proxy 2 and the HGW of the user terminal B in which the number of abnormal sessions exceeds a predetermined section threshold value (in the case, "1000") is recorded as a over-threshold section among the sections along the communication route from the area of source Proxy 3 to the area of destination Proxy 2, and information on the over-threshold section is transferred to the regulation object determining part 711.

Upon receiving the two-dimensional array data from the over-threshold contraposition detecting part 709, the regulation determining part 711 recognizes that the contraposition area-pair of source Proxy 3 and destination Proxy 2 are over-threshold contraposition area-pair. Then, the regulation determining part 711 traces sections along the communication route from the area of source Proxy 3 to the area of destination Proxy 2 in the order of steps S1201, S1202, and S1203 (as depicted in FIG. 12) on the basis of the linear array data notified from the over-threshold section detecting part 713, to recognize that the section "Proxy 2-HGW" is an over-threshold section.

In response thereto, the regulation display part 712 displays, as an influenced range of a fault occurrence in a network, the following pieces of fault occurrence information on a display screen, along with the contraposition abnormal session count display table 801 as depicted in FIG. 12.

Fault Occurrence Information:

(31) an identifier of the source proxy server, in the case, Proxy 3/(code) 0345;

(32) an identifier of the destination proxy server, in the case, Proxy 2/(code) 0234; and

(33) an identifier of the over-threshold section that is a section to be regulated, in the case, the section "Proxy 2-HGW".

In this way, the operator of the calculating server 202 can easily recognize the influenced range of a fault occurrence to which the call regulation is to be applied.

According to an embodiment, a probe apparatus that performs signaling message analysis is deployed before a proxy server apparatus, and the state of a communication session is estimated from data in the signaling message so that the influenced communication section and user due to an fault occurrence in a network can be identified.

According to an embodiment, when a probe apparatus estimates the state of a communication session, only the probe apparatus connecting to the proxy server apparatus on the source side that receives a request from a user terminal may be required to estimate the state of the communication session.

According to an embodiment, when a probe apparatus estimates the state of a communication session, not only the abnormal state of the communication session but also the abnormal communication section can be estimated.

According to an embodiment, information on an abnormally ended sessions and abnormal sections identified in plural probe apparatus are calculated in the calculating server apparatus and are displayed statistically between contraposition area-pair, whereby the operator can easily determine which proxy server apparatus is to be regulated.

In the aforementioned embodiment, the case where a signaling protocol method according to SIP (Session Initiation Protocol) is applied to has been described, as a representative example. However, the present invention is also applicable to a signaling protocol method other than SIP.

In the above mentioned examples according to the embodiment, an IP network is depicted as a representative network. However, the present invention may be also applicable to a network other than the IP network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for determining an influenced range of a fault occurrence in a network including a group of proxy servers for processing a signaling protocol for transferring signaling messages through a communication route connecting a pair of user terminals, comprising:
- providing proxy connection information indicative of connection relations between each pair of proxy servers included in the group of proxy servers in association with a direction of a traffic flow there between;
- establishing a communication session between a pair of user terminals by setting a communication route that connects the pair of user terminals and passes through one or more proxy servers included in the group of proxy servers;
- capturing a signaling message that is received or transmitted by each of the one or more proxy servers;
- detecting an abnormal end of the communication session between the pair of user terminals by analyzing the captured signaling message;
- determining a cause section that is a section included in the communication route connecting the pair of user terminals and has caused the detected abnormal end of the communication session;
- creating an abnormal session record including information on the abnormally ended communication session and information on the determined cause section;
- accumulating the abnormal session record created in association with the abnormally ended communication session to provide an abnormal session record set;
- counting the number of abnormally ended communication sessions caused by the cause section on the basis of the abnormal session record set; and
- determining the influenced range of the fault occurrence in the network, on the basis of the counted number of abnormally ended communication sessions caused by each of cause sections and the proxy connection information indicative of connection relations among the group of proxy servers, so as to display the influenced range of the fault occurrence in the network.

2. The method of claim 1, further comprising:
- transferring, at regular intervals, a signaling message of a session refresh request message for requesting refresh of the communication session, from one of the pair of user terminals, through the communication route, to the other one of the pair of user terminals;
- transferring a signaling message of a response message in response to the transferred session refresh request message, from the other one of the pair of user terminals, through the communication route, to the one of the pair of user terminals that transmitted the session refresh request message; and
- determining whether or not, a proxy server that is included in one or more proxy servers and transferred the session refresh request message, has received the response message within a predetermined response time,
- wherein the detecting an abnormal end of the communication session is performed when the session refresh request message is not captured within a predetermined refreshing time period, or when the communication session is terminated under the condition that the proxy server that transferred the session refresh request message has not yet received the response message within the predetermined response time.

3. The method of claim 2, further comprising:
- transmitting a signaling message of a request timeout message from the proxy server that transferred the session refresh request message, through the communication route between the pair of user terminals, to the one of the pair of user terminals that transmitted the session refresh request message, when the proxy server has not received the response message within the predetermined response time; and
- counting the number of request timeout messages received by each of the one or more proxy servers included in the communication route between the pair of user terminals,
- wherein the determining a cause section in the communication route coupling the pair of user terminals, is performed on the basis of the counted number of request timeout messages.

4. The method of claim 1, wherein one or more user terminals and a part of the network that are communicably connectable to a proxy server and handled thereby is defined as a management area corresponding to the proxy server, and the determining an influenced range of a fault occurrence in the network is performed by a procedure, comprising:
- obtaining a contraposition abnormal session count indicating the number of communication sessions abnormally ended in communication routes coupling a contraposition area-pair that is a pair of management areas each corresponding to one of the group of proxy servers;
- selecting an over-threshold contraposition area-pair having the contraposition abnormal session count exceeding a predetermined contraposition threshold value, from the obtained one or more contraposition area-pairs;
- obtaining, for each section included in a communication route coupling the selected over-threshold contraposition area-pair, a section abnormal session count indicating the number of abnormally ended communication sessions caused by the each section;
- selecting an over-threshold section having the section abnormal session count exceeding a predetermined section threshold value, from the communication route coupling the selected over-threshold contraposition area-pair; and
- determining the selected over-threshold section and the selected over-threshold contraposition area-pair, to be the influenced range of the fault occurrence in the network.

5. The method of claim 1, further comprising:
- creating an abnormal session record in which user information for identifying a user terminal, information on a occurrence time of an abnormally ended communication session, a source area code, and a destination area code, are included as information on the abnormally ended communication session;
- providing, as search keys, time information, a source area code, and destination area code;
- selecting one or more abnormal session records matching the provided search keys from the abnormal session record set; and
- extracting a piece of user information from each of the selected one or more abnormal session records so as to display a list of the extracted pieces of user information.

6. The method of claim 1, wherein the signaling protocol is a Session Initiation Protocol.

7. An apparatus for determining an influenced range of a fault occurrence in a network including a group of proxy servers for processing a signaling protocol that establishes a communication session between a pair of user terminals by setting a communication route that couples the pair of user terminals and passes through one or more proxy servers included in the group of proxy servers, comprising:
- a probe, coupled to a proxy server included in the one or more proxy servers, for detecting an abnormal end of a communication session established between the pair of user terminals, the probe being configured to:

capture a signaling message received or transmitted by the each of the one or more proxy servers;

detect an abnormal end of the communication session between the pair of user terminals by analyzing the captured signaling message;

determine a cause section that is a section included in the communication route connecting the pair of user terminals and has caused the detected abnormal end of the communication session; and create an abnormal end message including information on the abnormally ended communication session and information on the determined cause section, to transmit the created abnormal end message.

8. The apparatus of claim 7, wherein a signaling message of a session refresh request message for requesting refresh of the communication session is transmitted from one of the pair of user terminals through the communication route to the other one of the pair of user terminals, a signaling message of a response message is transferred in response to the transferred session refresh request message, from the other one of the pair of user terminals through the communication route to the one of the pair of user terminals that transmitted the session refresh request message, and an abnormal end of the communication session is detected when the session refresh request message is not captured within a predetermined refreshing time period, or when the communication session is terminated under the condition that the proxy server that transferred the session refresh request message has not yet received the response message within the predetermined response time.

9. The apparatus of claim 7, wherein a signaling message of a request timeout message is transmitted from the proxy server that transferred the session refresh request message through the communication route to the one of the pair of user terminals, when the proxy server that transferred the session refresh request message has not received the response message thereof within the predetermined response time, and the number of request timeout messages captured is counted, and the cause section in the communication route connecting the pair of user terminals is determined, on the basis of the counted number of the captured request timeout messages.

10. The apparatus of claim 7, further comprising:

a calculating server for determining a range of a network influenced by a fault occurrence therein, the calculating server being configured to:

receive an abnormal end message transmitted from the probe;

create an abnormal session record including information on the abnormally ended communication session and information on the determined cause section;

accumulate the abnormal session record created in association with the abnormally ended communication session to provide an abnormal session record set;

count the number of abnormally ended communication sessions caused by the cause section on the basis of the abnormal session record set; and determine an influenced range of a fault occurrence in the network, on the basis of the counted number of abnormally ended communication sessions caused by each of cause sections and the proxy connection information indicative of connection relations among the group of proxy servers, so as to display the determined influenced range of the fault occurrence in the network.

11. The apparatus of claim 10, wherein one or more user terminals and a part of the network that are communicably connectable to a proxy server and managed thereby is defined as a management area corresponding to the proxy server, and the influenced range of the fault occurrence in the network is determined by:

obtaining a contraposition abnormal session count indicating the number of communication sessions abnormally ended in communication routes coupling a contraposition area-pair that is a pair of management areas each corresponding to one of the group of proxy servers;

selecting an over-threshold contraposition area-pair having the contraposition abnormal session count exceeding a predetermined contraposition threshold value, from the obtained one or more contraposition area-pairs;

obtaining, for each section included in a communication route coupling the selected over-threshold contraposition area-pair, a section abnormal session count indicating the number of abnormally ended communication sessions caused by the each section;

over-threshold section selecting means for selecting an over-threshold section having the section abnormal session count exceeding a predetermined section threshold value, from the communication route coupling the selected over-threshold contraposition area-pair; and determining the selected over-threshold section and the selected over-threshold contraposition area-pair, to be the influenced range of the fault occurrence in the network.

12. The apparatus of claim 7, wherein the signaling protocol is a Session Initiation Protocol.

* * * * *